(12) United States Patent
Niemz

(10) Patent No.: US 8,670,289 B2
(45) Date of Patent: Mar. 11, 2014

(54) DISTANCE SENSOR AND METHOD FOR DETERMINING A DISTANCE

(75) Inventor: Volker Niemz, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 551 days.

(21) Appl. No.: 12/673,383

(22) PCT Filed: Jun. 24, 2008

(86) PCT No.: PCT/EP2008/058028
§ 371 (c)(1),
(2), (4) Date: Jun. 30, 2011

(87) PCT Pub. No.: WO2009/024375
PCT Pub. Date: Feb. 26, 2009

(65) Prior Publication Data
US 2011/0259106 A1    Oct. 27, 2011

(30) Foreign Application Priority Data
Aug. 21, 2007  (DE) .......................... 10 2007 039 348

(51) Int. Cl.
*G01S 15/08* (2006.01)
(52) U.S. Cl.
USPC .......................................................... 367/98
(58) Field of Classification Search
USPC .......................................................... 367/98
See application file for complete search history.

(56) References Cited

U.S. PATENT DOCUMENTS

| 4,809,241 A | 2/1989 | Block |
| 4,910,717 A * | 3/1990 | Terry ............................... 367/99 |
| 5,488,377 A * | 1/1996 | Reynolds et al. ............... 367/98 |
| 7,126,461 B2 | 10/2006 | Takeichi et al. |
| 2005/0110620 A1 | 5/2005 | Takeichi et al. |
| 2008/0089178 A1* | 4/2008 | Knittel ............................. 367/98 |
| 2011/0259106 A1* | 10/2011 | Niemz ............................. 73/632 |

FOREIGN PATENT DOCUMENTS

| CN | 1787393 | 5/2010 |
| DE | 43 35 728 | 4/1995 |
| EP | 1 562 050 | 8/2005 |
| EP | 1 624 319 | 2/2006 |
| GB | 2 207 757 | 2/1989 |

* cited by examiner

*Primary Examiner* — Daniel Pihulic
(74) *Attorney, Agent, or Firm* — Kenyon & Kenyon LLP

(57) ABSTRACT

A distance sensor has an ultrasound transceiver for transmitting ultrasound pulses and for receiving reflected ultrasound pulses from an object. A discriminator unit is configured for determining a center of distribution of the received reflected ultrasound pulse on the basis of the received reflected ultrasound pulse exceeding a first threshold value and subsequently dropping below a second threshold value. A propagation time analyzer device, is designed for determining, based on the determined center of distribution, the distance to the object.

9 Claims, 7 Drawing Sheets

DISTANCE SENSOR AND METHOD FOR DETERMINING A DISTANCE

FIELD OF THE INVENTION

The present invention relates to a distance sensor and a method for determining a distance; it relates in particular to a motor vehicle having a distance sensor and a parking assistance method based on the method for determining a distance.

BACKGROUND INFORMATION

A conventional parking assistance system determines a distance of a motor vehicle to objects in its surroundings. The determined distances are signaled to a driver of the motor vehicle acoustically and with the aid of a display. Such a parking assistance system is known from DE 43 35 728 A1, for example.

A method for determining the distance uses a pulse echo method (propagation time measurements) of ultrasound pulses. The distance between the motor vehicle and an object is determined as the product of the speed of sound in air and a time period between transmission of an ultrasound pulse and receipt of the reflected portions of the ultrasound pulse. The time period is measured by a timer which is started by the transmission of the ultrasound pulse and is stopped at the point in time when a receiver receives an ultrasound signal which exceeds a predetermined signal level.

SUMMARY OF THE INVENTION

According to the exemplary embodiments and/or exemplary methods of the present invention, as described herein, a distance sensor is provided having an ultrasound transceiver for transmitting ultrasound pulses and receiving ultrasound pulses reflected from an object, a discriminator unit which is designed for determining a center of distribution of the received reflected ultrasound pulse based on the received reflected ultrasound pulse having exceeded a first threshold value and subsequently having dropped below a second threshold value, and a propagation time analysis device which is designed for determining the distance to the object based on the determined center of distribution.

Furthermore, a method is provided for determining a distance to an object with the aid of a propagation time measurement of a reflected ultrasound pulse, the end of the propagation time measurement being established by a center of distribution of the reflected ultrasound pulse.

One aspect of the exemplary embodiments and/or exemplary methods of the present invention is the use of the center of distribution of the reflected ultrasound pulse for determining the propagation time of an ultrasound pulse. It has been recognized that such a propagation time measurement is more independent of environmental influences such as, for example, ambient temperature, air moisture, atmospheric pressure, and wind.

The exemplary embodiments and/or exemplary methods of the present invention is elucidated below in greater detail with reference to specific embodiments and the appended figures.

DETAILED DESCRIPTION

Figure 1:
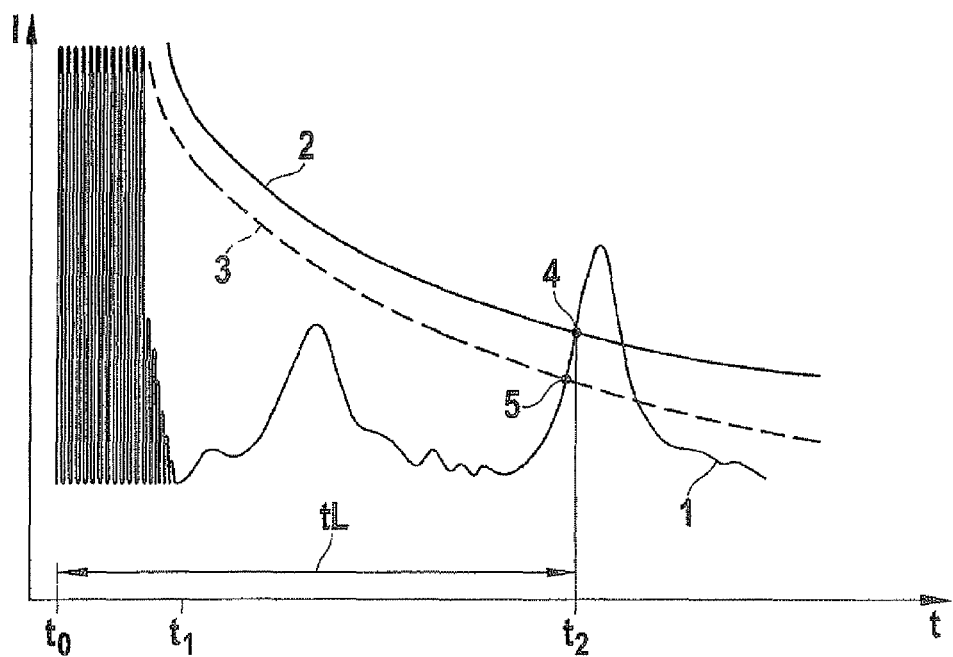
FIG. 1 shows an example of a time curve of a detected signal intensity by an ultrasound receiver.

A mode of operation of a method for determining a distance to an object is elucidated, as an example, with reference to FIG. 1, which shows the typical and schematically illustrated signals 1 of an ultrasound receiver of a distance sensor.

An ultrasound pulse is transmitted by an ultrasound transmitter between points of time t0 and t1. The ultrasound receiver may be deactivated during the transmission. Subsequently, the ultrasound receiver receives ultrasound pulses which are generated by reflections of the emitted ultrasound pulse on objects.

The ultrasound receiver also partly receives reflected portions of the ultrasound pulses which were transmitted before the latest transmitted ultrasound pulse. These reflected portions usually have a low intensity I and are suppressed with the aid of a suitably selected threshold value curve 2. Threshold value curve 2 may be a hyperbolic function of time t as FIG. 1 shows, or another suitable threshold value curve 2 whose threshold value decreases over time after an ultrasound pulse has been transmitted.

A timer detects time period tL between point in time t0 of the transmission of the ultrasound pulse and point in time t2 when the intensity of a reflected ultrasound pulse exceeds threshold value 4 of threshold value curve 2. Time period tL approximately corresponds to twice the propagation time between the ultrasound transmitter and receiver. However, the determined propagation time is a function of the selection of threshold value curve 2, as shown by threshold value curve 3 depicted for comparison. When a threshold value curve 2 having relatively high threshold values is selected, a longer propagation time is determined. In the same way, a longer propagation time is determined in the event of a higher dampening of the ultrasound pulses by the surroundings. The dampening of the ultrasound pulses is influenced, among other things, by the air moisture, the ambient temperature, the atmospheric pressure, and the wind conditions.

Figure 2:
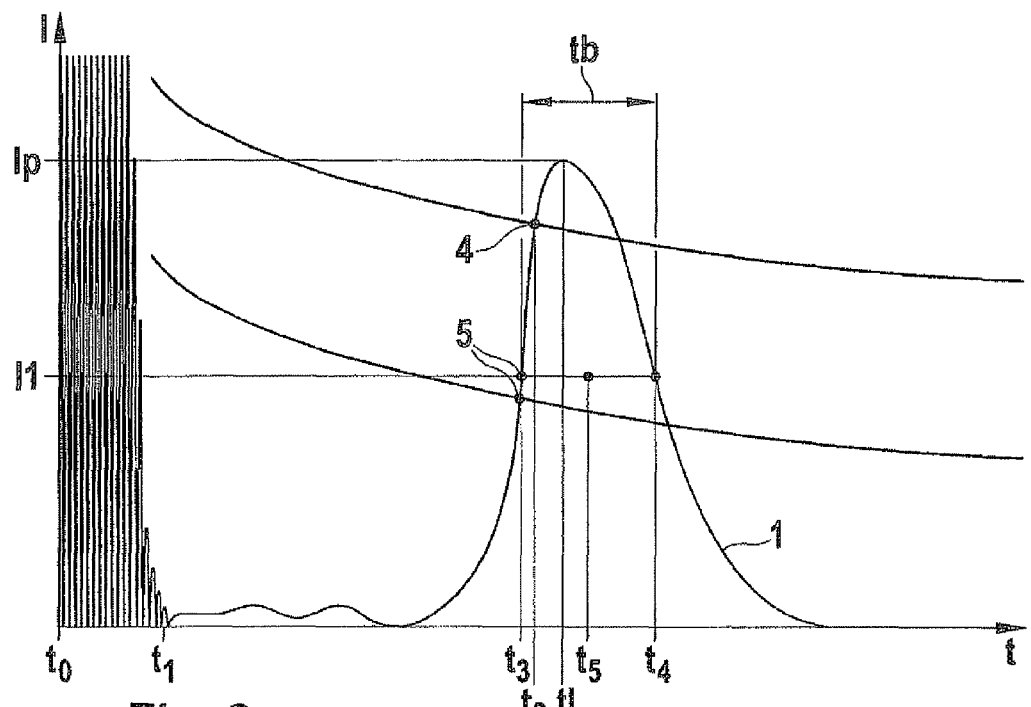
FIG. 2 shows an example of a time curve of a detected signal intensity of an ultrasound receiver for illustrating one specific embodiment.

In a first specific embodiment of a method, a pulse width tb of a reflected pulse is determined at a predefined signal intensity I1 (FIG. 2). Pulse width tb corresponds to the time period between a point in time t3 when a first threshold value is exceeded for the first time, corresponding to predefined signal intensity I1, and a subsequent point in time t4 when the signal intensity for the first time drops below a second threshold value, which in the present exemplary embodiment is also selected to be equal to predefined signal intensity I1.

For determining propagation time tL, the signal maximum Ip of the reflected ultrasound pulse is used. The signal maximum is determined approximately as the center of distribution t5 between point in time t3 and point in time t4. As is apparent from FIG. 1, the difference between center of distribution t5 and point in time t1 at which signal maximum Ip occurs is less than the corresponding time differences between points of intersection 4, 5 of threshold value curves 2, 3 with intensity curve I of reflected signal 1 and intensity maximum Ip.

Center of distribution t5 may be ascertained as the center of pulse width tb. In another embodiment, center of distribution t5 is determined by a weighted average according to the formula $t5=(\frac{1}{2}-a)t4+(\frac{1}{2}+a)t3$, parameter a being selectable between $-\frac{1}{2}$ and $+\frac{1}{2}$.

Figure 3A:
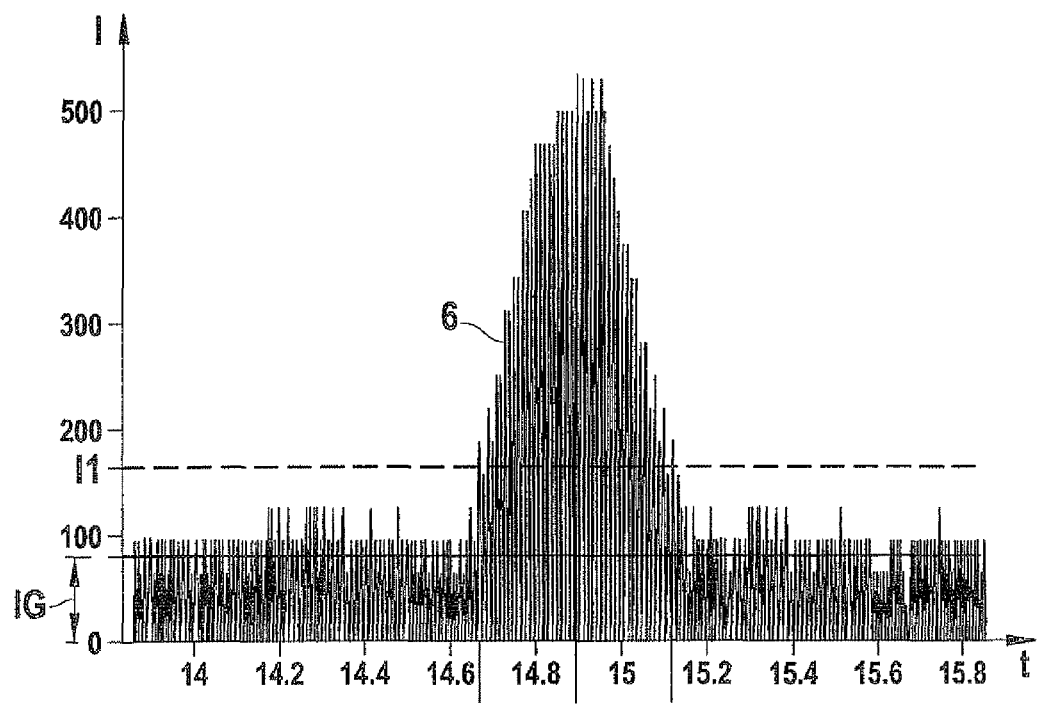
FIG. 3a shows the illustration of a signal noise for elucidating one embodiment.

Predefined signal intensity I1 may be established on the basis of a signal noise of the ultrasound transmitter used and of the ultrasound receiver used. One embodiment of the method provides for determining the signal noise in a first step. FIG. 3a shows intensity I of a received reflected ultrasound pulse 6 in arbitrary units as an example. Signal noise IG is approximately 80 mV here, for example. A noise analyzer device determines the signal noise using statistical analysis methods. Predefined signal intensity I1 or the first threshold value are established as approximately twice the determined signal noise IG. In other specific embodiments, another multiple from the range between 1.5 times up to 5 times is established rather than twice the determined signal noise. Center of distribution t5 is determined as described for the first specific embodiment.

The noise changes with the temperature. In one embodiment, the above-described method measures the signal noise regularly during operation, for example, after a predefined number of emitted ultrasound pulses, and ascertains again predefined signal intensity I1.

Figure 3B:
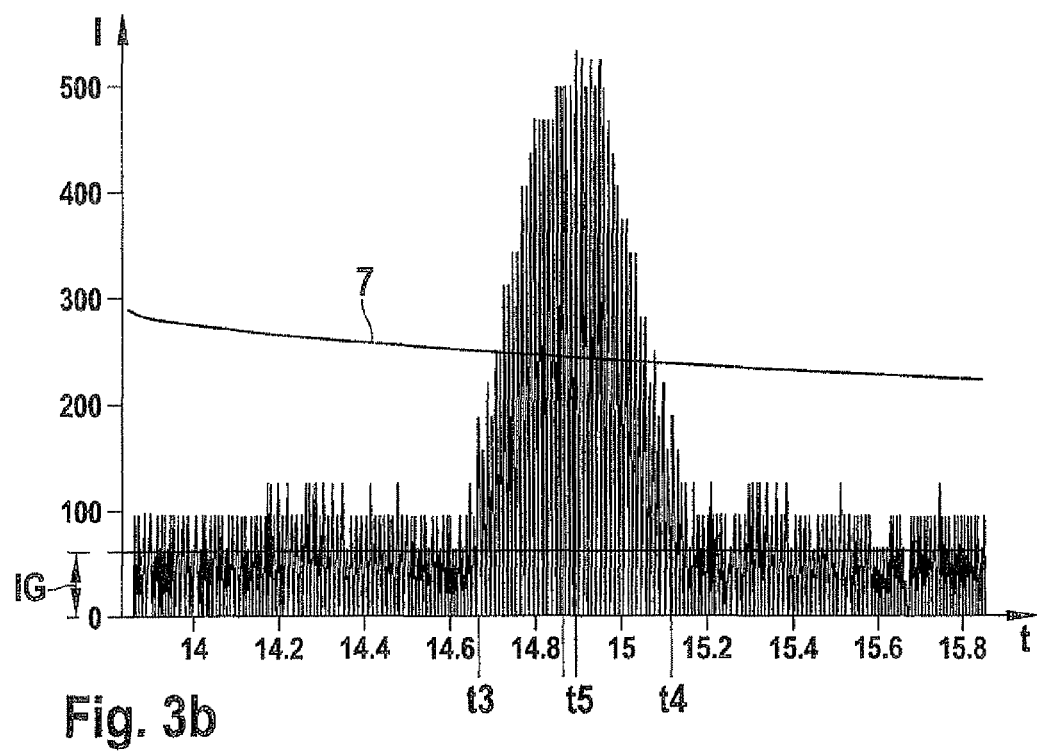
FIG. 3b shows the illustration of another embodiment in connection with a signal noise.

In the previous embodiments of the method, the first threshold value and the second threshold value are fixed to predefined signal intensity I1. In another embodiment, a threshold value curve 7 is determined as a function of signal noise IG. (FIG. 3b). Threshold value curve 7 may show a threshold value as a hyperbolic function of the time period since the emission of the ultrasound pulse. Intensity I of reflected ultrasound pulse 6 is compared with threshold value curve 7. Accordingly, points in time t3 and t4 are determined when intensity I of ultrasound pulse 6 exceeds and drops below threshold value curve 7, respectively. Center of distribution t5 is determined as in the above-described specific embodiment.

Figure 4:
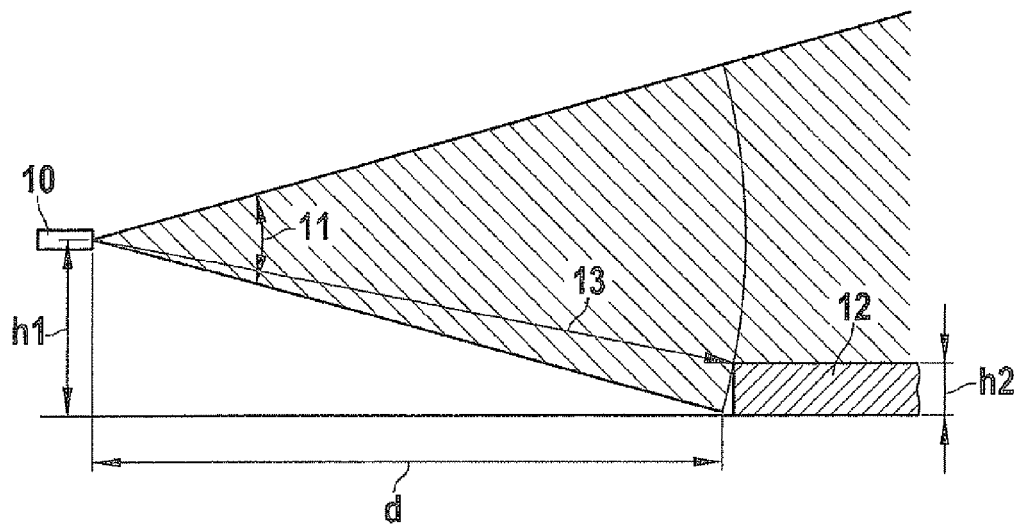
FIG. 4 shows geometrical explanations to another specific embodiment.

FIG. 4 schematically shows an ultrasound transceiver 10, which transmits ultrasound pulses within a solid angle 11 and receives ultrasound pulses from these directions. Ultrasound transceiver 10 is installed at a vertical distance h1 from the ground. In the depicted example, an object 12 of small height h2, for example, a curb, reflects ultrasound pulse 13. Height h2 of object 12 is smaller than vertical distance h1, i.e., transceiver 10 is situated above object 12.

Distance d measured in the plane of the ground, hereinafter referred to as lateral distance, is relevant for parking. A distance determined from the propagation time of ultrasound pulse 13 is greater than lateral distance d. The difference between a distance ascertained from the propagation time measurement and lateral distance d is significant in particular for objects 12 whose height h2 is less than installation height h1 of transceiver 10.

Figure 5:
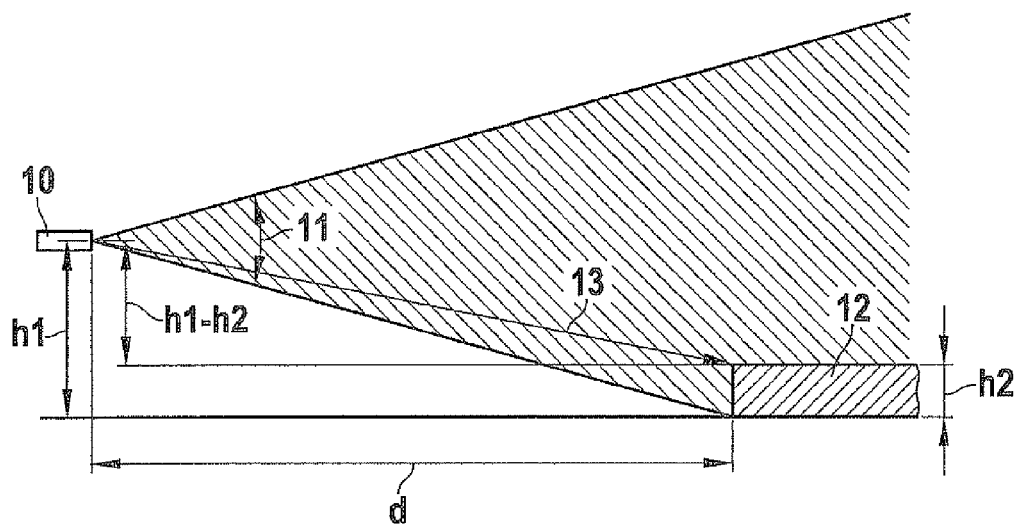
FIG. 5 shows geometrical explanations to the other specific embodiment.

A second specific embodiment corrects the distance measured from the propagation time measurement of ultrasound pulse 13. The propagation time of ultrasound pulse 13 may be ascertained as in the first specific embodiment. An estimator device estimates height h2 of object 12 on the basis of reflected ultrasound pulses 13. A correction device ascertains lateral distance d of object 12 according to Pythagoras's theorem from the difference of vertical distance h1 and the height of object h2 and from the propagation time of ultrasound pulse 13 (see FIG. 5).

Figure 6:
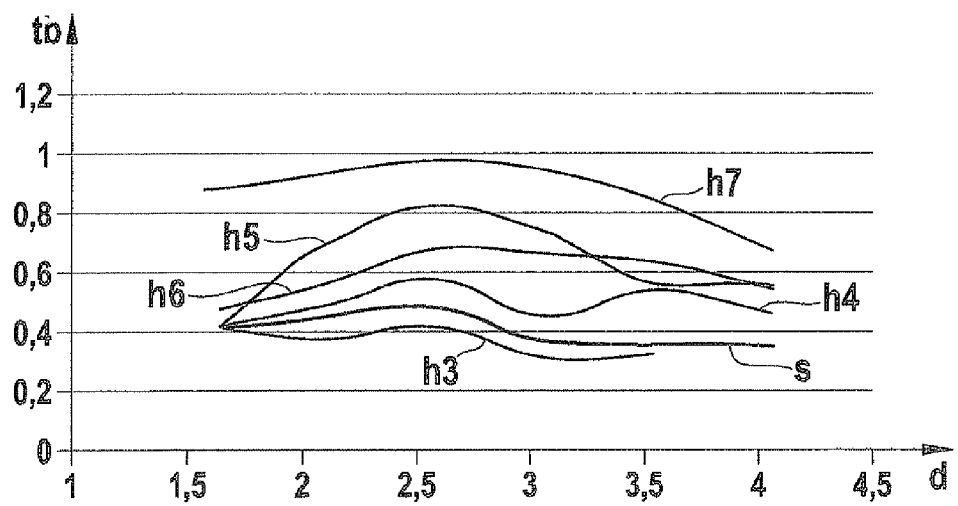
FIG. 6 shows the depiction of a pulse width tb as a function of the object height.

The estimator device uses one or more features of the reflected ultrasound pulses to ascertain height h2 of object 12 therefrom. The estimator device may analyze average pulse width tb of reflected ultrasound pulses 13 among other things. FIG. 6 shows a series of measurements h3 through h7 for determining the pulse widths tb as a function of lateral distance d for objects 12 of different heights. Measurement h3 was performed on the smallest object; measurement h7 was performed on the largest object. It is apparent that pulse width tb increases with increasing height h2 of the object. A characteristic field which assigns a height h2 of object 12 to the pulse widths is stored in the estimator device. The characteristic field may also take into account pulse width tb as a function of the distance to the object for ascertaining height h2.

The estimator device may further estimate whether an object is relevant for the parking assistance system. An object 12 having a very small height h2 is recognized by a small pulse width tb. If pulse width tb is below a threshold value s or a threshold value curve, the estimator device signals to the distance sensor to suppress the corresponding ultrasound pulses.

Figure 7:
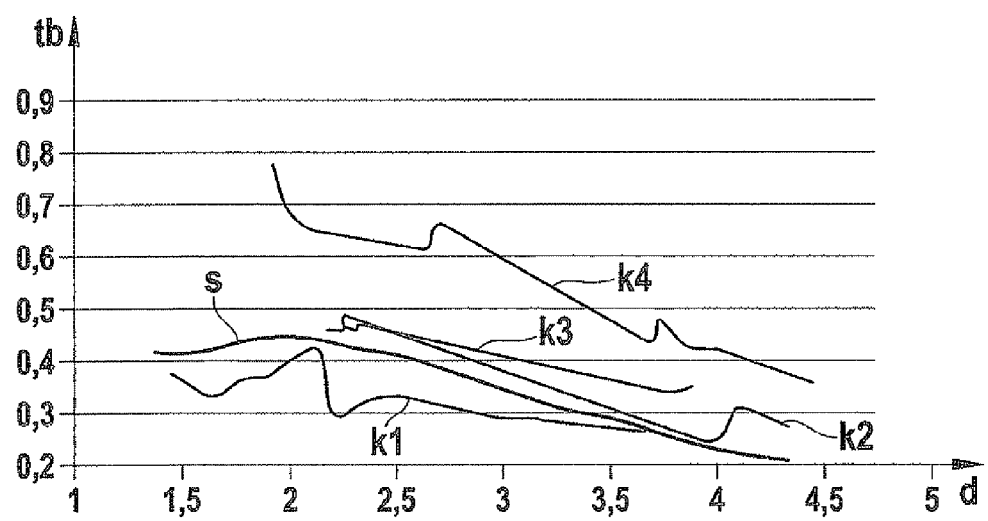
FIG. 7 shows a pulse width tb as the dynamic function of the object height.

Another feature for estimating height h2 is obtained by continuously measuring pulse width tb during the movement of the distance sensor. When parking or when leaving the parking space, a characteristic field is obtained from pulse width tb plotted against lateral distance d for different objects. Knowing the objects, for example, curb k1, fence k2, hedge k3, and wall k4, the height of the object may be deduced. FIG. 7 shows pulse width tb plotted as a function of the distance of the different objects. A corresponding characteristic field is stored in the estimator device for evaluation.

Figure 8:
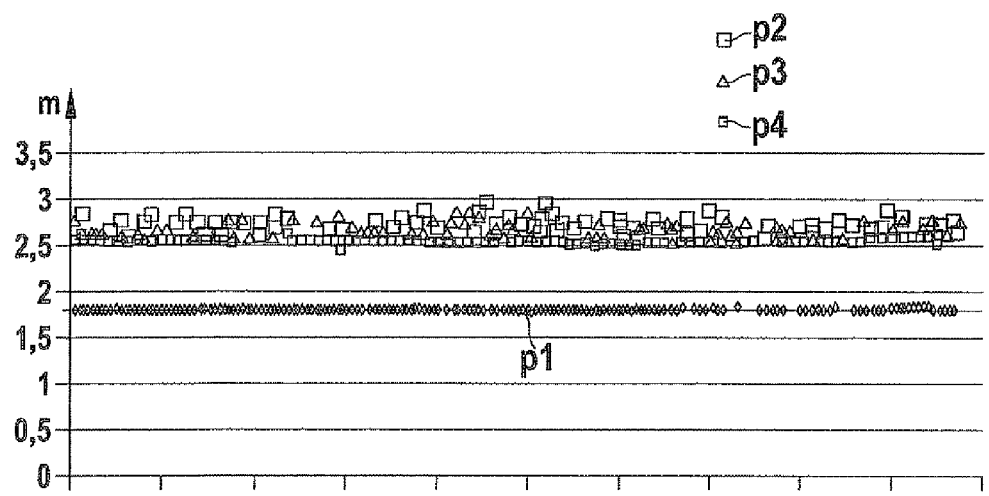
FIG. 8 shows the curves of received ultrasound pulses from different objects.

Another feature for distinguishing large and small objects is the number of reflections on the object. FIG. 8 shows an exemplary measurement series while a vehicle having a distance sensor travels parallel to a building wall and a curb edge. A single reflected ultrasound pulse p1 is received from the curb edge located at the distance of 1.8 m. In contrast, three reflected ultrasound pulses p2, p3, p4 are received from the building wall.

Figure 9:
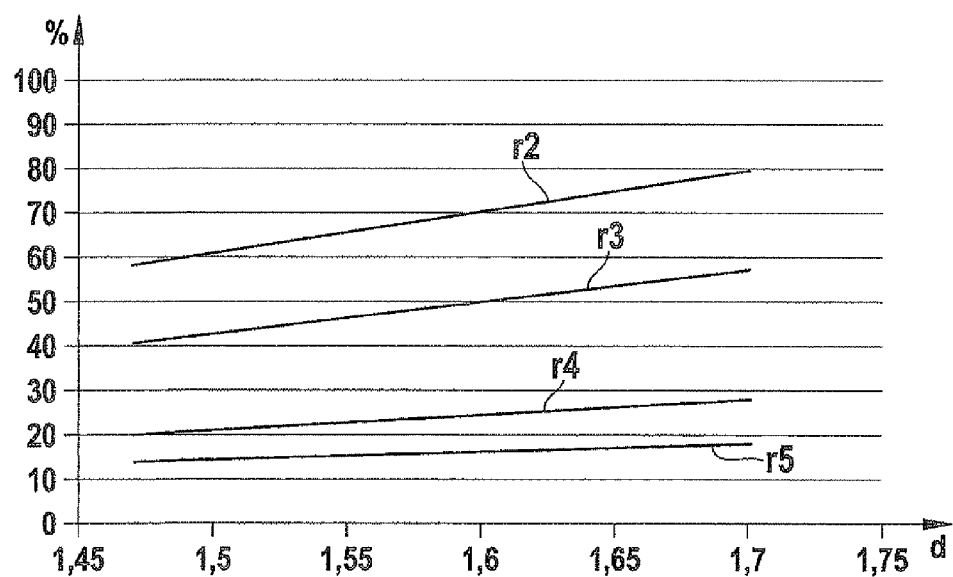
FIG. 9 shows a probability of multiple reflections on a row of vehicles as a function of the distance to the row of vehicles.
Figure 10:
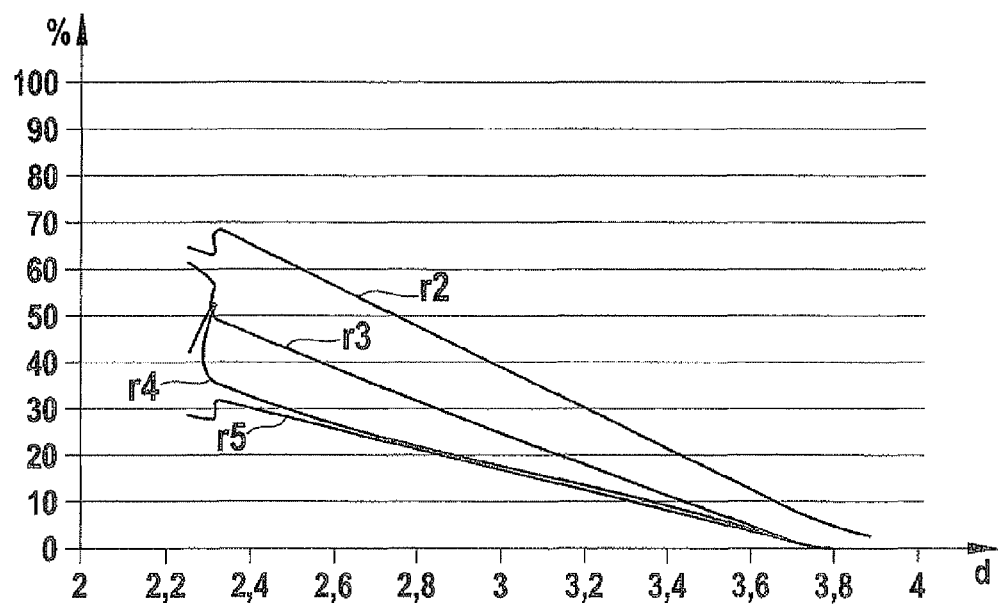
FIG. 10 shows a probability of multiple reflections on a hedge as a function of the distance to the hedge.

A systematic evaluation of the probability of multiple reflections occurring is shown, among other things, by FIG. 9 for a series of cars and by FIG. 10 for a hedge. The probability of a second reflection r2, a third reflection r3, a fourth reflection r4, and a fifth reflection r5 occurring is plotted against distance d. The estimator device performs a statistical analysis of the reflected ultrasound pulses for determining the given rate for corresponding multiple reflections occurring. The rate or the change in the rate with the distance to the object is compared to the stored characteristic fields of probabilities for multiple reflections occurring in order to determine the height of the object.

Figure 11:
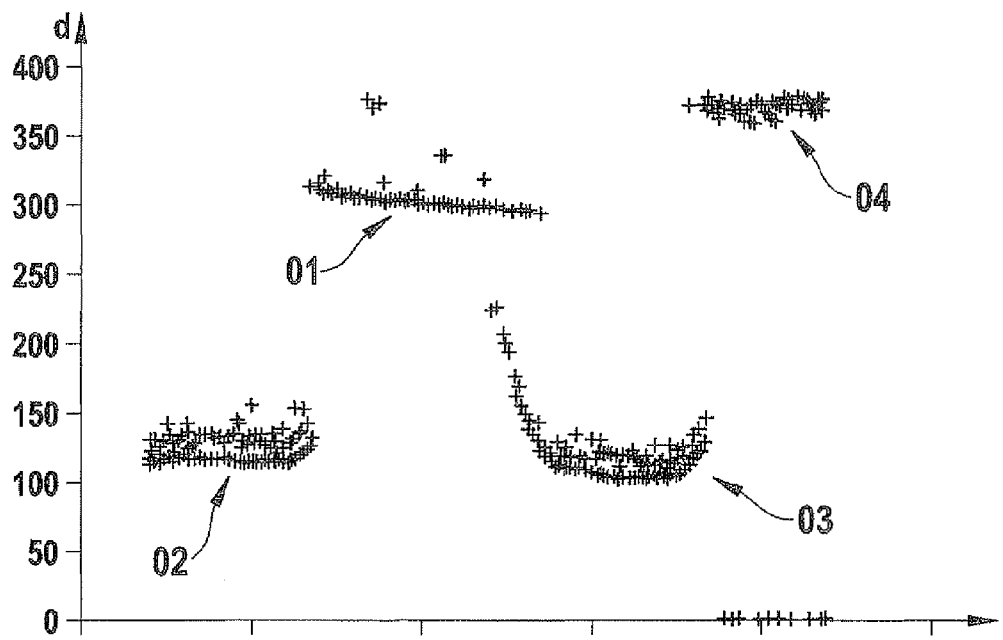
FIG. 11 shows the statistical distribution of the determined distances as a function of the object height.

Another feature for distinguishing objects having different heights is given by the statistical distribution of pulse width tb. A measurement series on five objects is shown in FIG. 11 as an example. The determined lateral distance d to the individual objects is plotted on the y axis. Measured points of are assigned to a low object; measured points o2, o3, and o4 are assigned to high objects. It is apparent that there is a correlation between the spread of the determined distances d and the height of the objects. The estimator device uses this correlation with the aid of a stored characteristic field for determining the height of the object after it has ascertained the spread of the determined distances from their statistical analysis.

Figure 12:
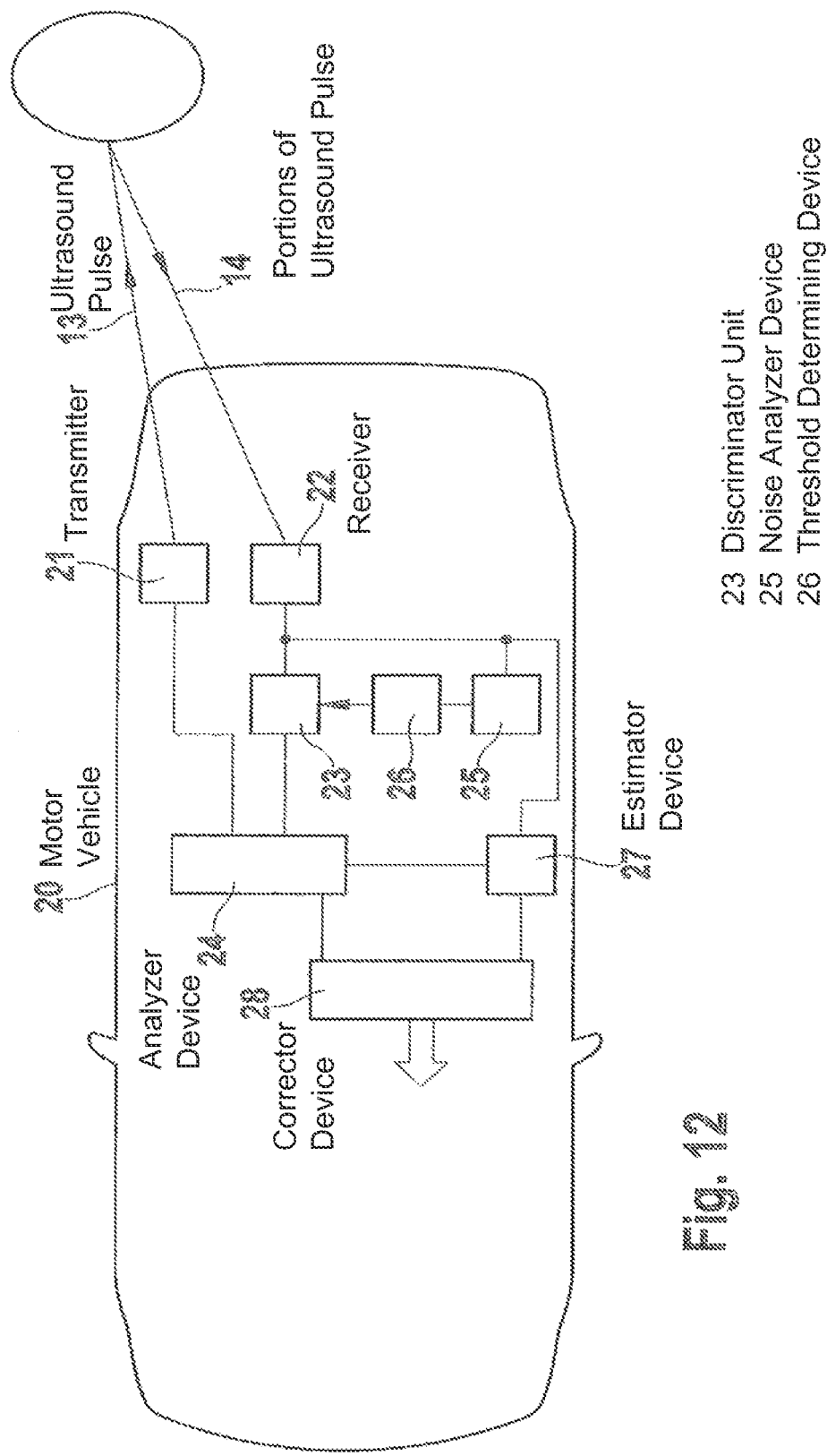
FIG. 12 shows the block diagram of a distance sensor.

FIG. 12 shows one specific embodiment of a distance sensor for a motor vehicle 20. An ultrasound pulse transmitter 21 is used for transmitting ultrasound pulses 13 at a predefined solid angle. Portions 14 of ultrasound pulse 13, reflected from objects, are detected by an ultrasound receiver 22. A discriminator unit 23 determines the center of distribution of reflected ultrasound pulse 14 on the basis of predefined threshold values. An analyzer device 24 determines, on the basis of the center of distribution of ultrasound pulse 13 and the point in time when it was transmitted, a propagation time of ultrasound pulse 13 to the object. A noise analyzer device 25 analyzes the signal noise of the received ultrasound signals and of receiver 22. A threshold determining device 26 establishes, according to the determined signal noise, the threshold values for discriminator unit 23. An estimator device 27 may be integrated in the distance sensor in order to determine, from the ultrasound signals and/or the ascertained distances, the height of the reflecting object. The ascertained height and the distances determined from the propagation time measurements are supplied to a corrector device 28 for ascertaining the lateral distance.

What is claimed is:

1. A distance sensor, comprising:
an ultrasound transceiver for transmitting ultrasound pulses and for receiving reflected ultrasound pulses from an object;
a discriminator unit for determining a center of distribution of the received reflected ultrasound pulses based on the received reflected ultrasound pulse exceeding a first threshold value and subsequently dropping below a second threshold value; and
a propagation time analyzer device for determining, based on the determined center of distribution, the distance to the object;
an estimator device for estimating a height of the object based on at least one of a pulse width of the reflected ultrasound pulses, a ratio of a number of reflected ultrasound pulses to a number of transmitted ultrasound pulses, and a distribution of the centers of distribution of reflected ultrasound pulses of an object; and
a correction unit for correcting the distance determined from the propagation time analyzer device as a function of the estimated height.

2. The distance sensor of claim 1, further comprising:
a noise analyzer device for determining a signal noise of the ultrasound transceiver; and
a threshold value determining device for establishing the first threshold value and the second threshold value as multiples of the determined signal noise.

3. A method for determining a distance to an object, the method comprising:
establishing an end of a propagation time measurement by a center of distribution of a reflected ultrasound pulse; and
determining the distance to the object based on the propagation time measurement of the reflected ultrasound pulse;
estimating a height of the object based on at least one of a pulse width of the reflected ultrasound pulses, a ratio of a number of reflected ultrasound pulses to a number of transmitted ultrasound pulses, and a distribution of the centers of distribution of reflected ultrasound pulses of an object; and
correcting the distance determined from the propagation time analyzer device as a function of the estimated height.

4. The method of claim 3, wherein the center of distribution is determined as a point in time which is located between a first point in time when the ultrasound pulse exceeds a first threshold value and a subsequent second point in time when it drops below a second threshold value.

5. The method of claim 4, wherein the center of distribution is determined as a weighted average of the first point in time and the second point in time.

6. The method of claim 3, wherein a height of the object is estimated based on a plurality of reflected ultrasound pulses, and wherein the distance determined by the propagation time measurement is corrected as a function of the estimated height of the object.

7. A method for determining a distance to an object, the method comprising:
establishing an end of a propagation time measurement by a center of distribution of a reflected ultrasound pulse; and
determining the distance to the object based on the propagation time measurement of the reflected ultrasound pulse;
wherein a height of the object is estimated based on a plurality of reflected ultrasound pulses, and wherein the distance determined by the propagation time measurement is corrected as a function of the estimated height of the object; and
wherein the height of the object is determined from the plurality of reflected ultrasound pulses based on at least one of a pulse width of the reflected ultrasound pulses, the ratio of the number of reflected ultrasound pulses to the number of transmitted ultrasound pulses, and a distribution of the distances determined by propagation time measurement.

8. The method of claim 3, wherein a signal noise is determined and the first threshold value and second threshold value are established as multiples of the signal noise.

9. The method of claim 3, wherein the first threshold value and the second threshold value are established as a function of the ambient temperature.

* * * * *

UNITED STATES PATENT AND TRADEMARK OFFICE
CERTIFICATE OF CORRECTION

PATENT NO. : 8,670,289 B2  Page 1 of 1
APPLICATION NO. : 12/673383
DATED : March 11, 2014
INVENTOR(S) : Volker Niemz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this

Twenty-ninth Day of September, 2015

Michelle K. Lee
*Director of the United States Patent and Trademark Office*